July 18, 1967 J. HETTEIX 3,331,317

HIGH SPEED BAR PRINTER

Filed May 19, 1964 6 Sheets-Sheet 1

INVENTOR
JACQUES HETTEIX DECEASED
BY IRENE MARY HETTEIX EXECUTRIX

BY David Lesslene

ATTORNEY

July 18, 1967 J. HETTEIX 3,331,317

HIGH SPEED BAR PRINTER

Filed May 19, 1964

6 Sheets-Sheet 3

PARALLEL PRINTING MODES

STORE 90

STORE 52

STORE 90

STORE 52

SERIAL PRINTING MODES

STORE 90

STORE 52

STORE 90

STORE 52

United States Patent Office 3,331,317

Patented July 18, 1967

3,331,317
HIGH SPEED BAR PRINTER

Jacques Hetteix, deceased, late of Norristown, Pa., by Irene Mary Hetteix, executrix, Norristown, Pa., assignor to Sperry Rand Corporation, New York, N.Y., a corporation of Delaware Filed May 19, 1964, Ser. No. 369,054
29 Claims. (Cl. 101—93)

This invention relates to high speed printing devices and more particularly to an improved form of high speed printing device employing a print bar which moves in a direction transverse to the direction of movement of a print receiving medium.

In order that the information available from high speed computing and data processing systems be available to a human user, observer, or evaluator, this information must be made available in a printed form upon a record medium. New techniques have been developed to keep up with these high speed systems. These techniques require the use of buffer storage to allow the matching of a high speed system to a lower speed printer or increases in the printer speed to match the speed of the high speed system.

Certain increases in the speed of printing devices have been achieved by the use of the parallel printing mode together with printing drums which make the same character type available to each column of a record simultaneously. Such a system permits the printing in all columns which contain the same character, simultaneously. However, this increase in speed necessitates a great increase in the amount of equipment and power required by the system. Certain disadvantages are also encountered which affect the print quality across a print line. Since there may be a great variation in the number of hammers which might be fired at one time, from one to all of the print hammers which may be available to permit printing in all of the print columns at one time (under the extreme conditions) the current available to fire the hammer actuators may vary greatly. Variations in current effect the energy imparted to the hammers and thus change the hammer impact at the record varying the quality of the recorded type impression. In addition to the impact force of the hammer, the speed of the hammer will also be affected by the current applied to the actuator. The speed will affect the time it takes the hammer to move from its rest position until it causes printing. In that the print drum is constantly rotating during the printing operation, variations in the travel time of the hammer will effect the alignment of the printed character, as well as its color quality along a single character. For example, if the hammer hits solidly on the bottom of the E character type, the bottom of the E will be dark while the top of the E will be lighter. Also if the hammer arrives very late, it may result in the printing of only the last portion of a character type. Movement of the record during printing may also add to the disadvantages noted above. The effects of these defects is to give poor horizontal character alignment and poor print quality. These aforementioned effects are objectionable to the eye. To correct these defects requires complex equipment and continuous maintenance of the prior art equipment.

The problem of horizontal alignment was eliminated by the development of the band or chain type of printing device wherein a font of character type was caused to move in a plane transverse or longitudinal to the direction of record movement. The record could then be driven against the band or chain mounted type or the type moved against the record depending on the particular device. Although the horizontal print quality and horizontal alignment was improved, band or chain type printers still had severe speed limitations in that individual character type must be moved toward the record or the record moved toward the type, each of which took certain minimum times depending upon the mass to be moved and the inertia. The continuous use, in a band printer, of certain characters like the letter E caused the band to be greatly weakened affecting its timing and control. Further increases in the length of the band or chain due to fatigue also seriously affects the timing and control of the band or chain printer. Such defects lead to unreliable printing.

Further attempts to improve horizontal alignment in high speed printing devices resulted in the use of a print bar moved transverse or longitudinal to the direction of record movement. The bar printer offered a rigid, heavier means for supporting and carrying the type, which was not as subject to wear and breakage as was the thin, flexible chain and band printer. Such a printer is described in United States Patent No. 2,874,634, issued Feb. 29, 1959, to Theo Hense. The print bar shown in said patent is actually a carrier of character type each individually mounted for movement from the carrier towards the record surface. A plurality of hammers, one for each possible printing position are placed along the width of the record. Each hammer can be individually selected, and when selected, would strike against the rear portion of a character type causing the character type to move out from the carrier, as the carrier traversed the record width, and strike the record and cause printing. Springs or other similar restoring devices would then act upon the character type to return them to the surface of the carrier. This device had the obvious limitation of mechanical speed at which the character type could be moved from the carrier to the surface of the record and restored thereto.

The instant invention seeks to overcome and does overcome the difficulties noted in prior art printing devices and notatably in prior art printing devices of the bar, chain and band types. The invention employs a solid bar upon which one or more complete fonts of character type is mounted on a first surface. The print bar is fitted for movement transverse to the direction of the record motion. A hammer assembly is mounted behind the record consisting of one hammer for each one of the character spaces which may be printed in a line. As the desired character type on the surface of the print bar is in line with the space in which the character is to be printed, the hammer is fired, causing the record to move against a ribbon and then against the character type to cause printing of that character. The print bar has coded notations upon a further surface so that the character then available for printing is identifiable and to provide necessary timing pulses. A first addressable storage device is employed to store all the characters which are to be printed across a single line. A second addressable memory is employed to store the coded representations of the character type found upon the first surface of the bar. Continual comparison is made, as the print bar traverses the record width, between the character stored for printing and the character type available for printing. When a comparison is found to exist, a hammer is fired to cause the printing of that character. The comparison has indicated that at a particular columnar position, the character stored in the characters to be printed memory matches the then available character type.

The motion of the print bar across the width of the record, while the record is maintained stationary insures that there will be horizontal alignment of the respective characters. There is some degree of vertical misalignment, however, which is easily tolerated by the eye, which is used to seeing characters such as the I, A, and the H next to one another with their disproportionate relative spacing. The eye, however, is not used to seeing nor does it tolerate as well horizontal misalignment.

In that the printing bar is caused to move across the surface of the record in a first direction, for example, from the left margin to the right margin, and then return from the right margin to the left margin, the printing of two lines may take place in one complete cycle of motion of the print bar. By repeating the font, that is making available more than a single complete repertoire of all the characters to be printed, along the surface of the bar, the length of throw or the length of travel of the bar to print an entire line is greatly reduced. Thus by combining a multiple number of character fonts and by permitting the bar to travel across the surface of the record in two directions, making the characters available for printing as they travel, in both directions, the printing speed of the bar printer is increased without greatly increasing the mechanical speeds of the elements involved.

Additionally, printing may take place in either the serial or parallel modes. That is with the hammers striking column by column or by all characters wherein alignment is achieved striking at a single time. It is, therefore, an object of this invention to provide an improved form of high speed printer.

It is another object of this invention to provide an improved form of high speed bar printing device.

It is still another object of this invention to provide an improved form of high speed printing device for printing on a record employing a solid type carrying element in which the record is forced against the surface of the type.

It is still another object of this invention to provide an improved form of bar printing device upon which a plurality of character fonts are found upon the surface of the bar and in which two print cycles are available for each cycle of motion of the print bar.

It is yet another object of this invention to provide a bar printer in which complete character fonts may be quickly and easily replaced at will.

Further objects and features of the invention will be pointed out in the following descriptions and claims, and illustrated in the accompanying drawings which disclose, by way of example, the principles of the invention and the best mode which has been contemplated for carrying it out.

Figures 1, 2, 2A, 2C:
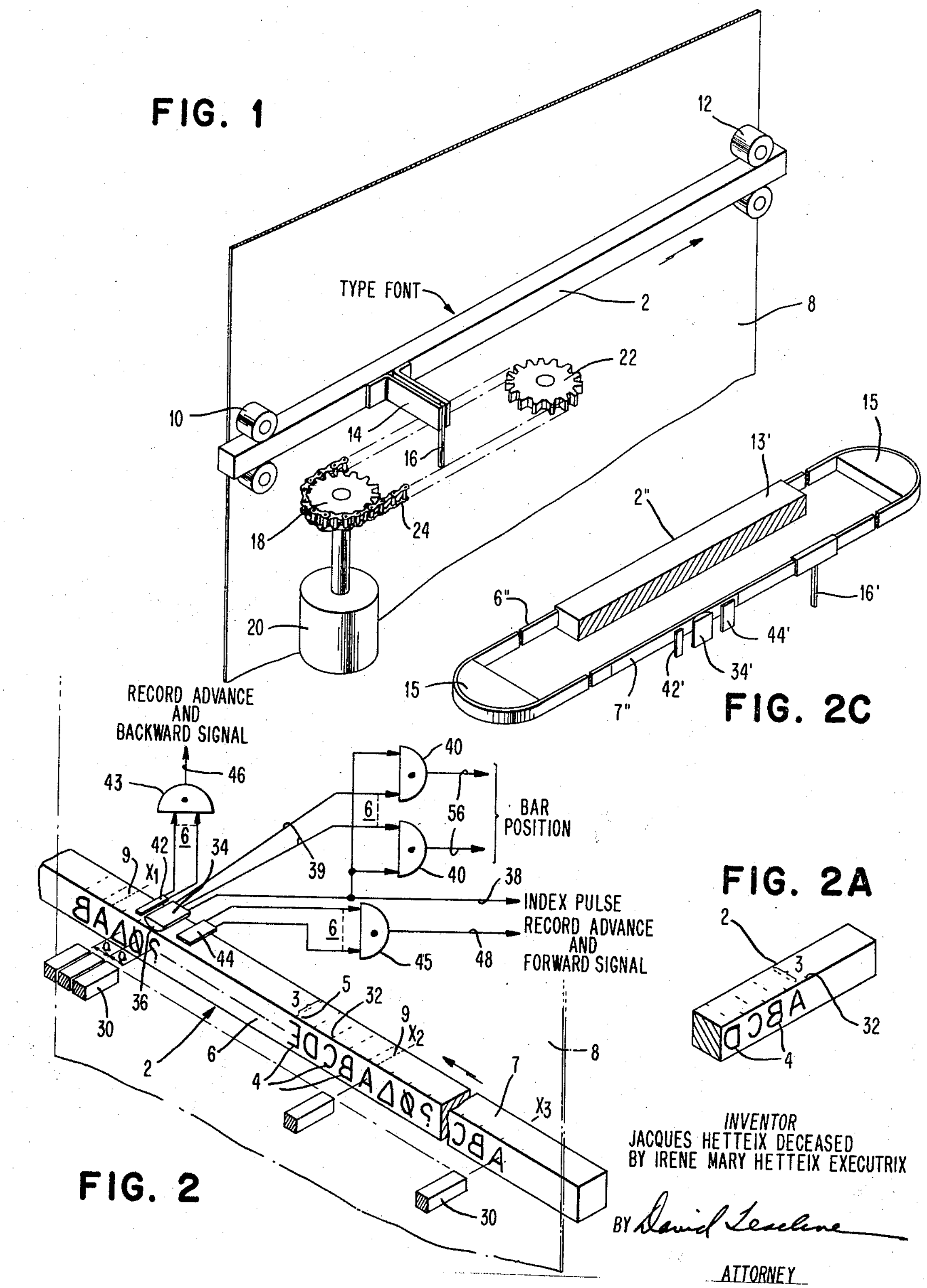
FIGURE 1 illustrates the printing bar and drive mechanism therefore as viewed from the front of the print mechanism.
FIGURE 2 is an illustration of the printing bar of FIGURE 1 viewed from the top, and illustrating the location of the character type upon a first surface as well as certain control signals upon a second surface and in addition, gating elements which are employed with said print bar.
FIGURE 2A illustrates an alternative arrangement of the type and coded notation of the print bar of FIGURE 2.
FIGURE 2C is a further form which the print bar of FIGURE 2 may take.
Figures 3, 4B:
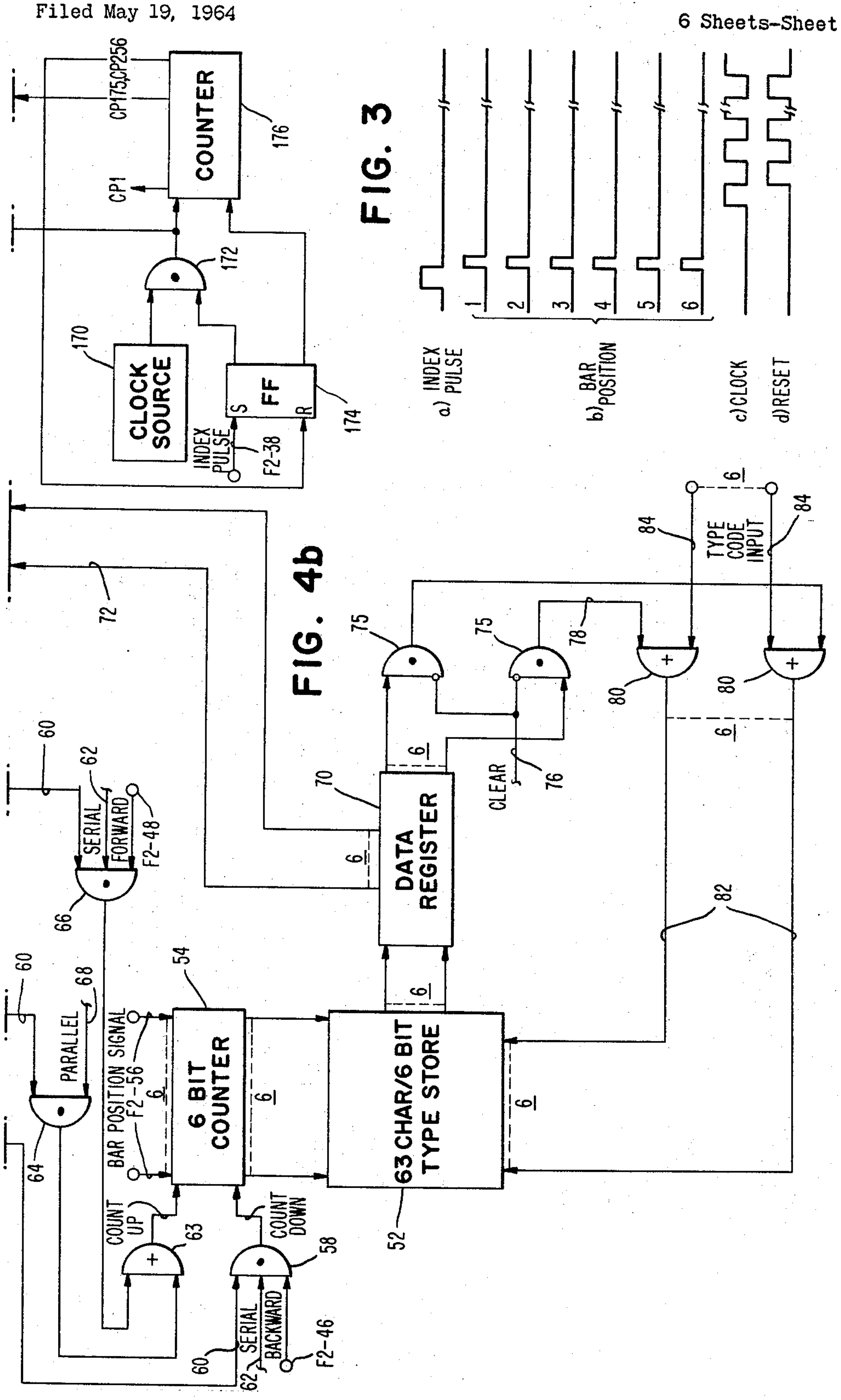
FIGURE 3 is a timing diagram of the timing and control signals which are employed with the printing system of FIGURE 1.
Figures 4, 4A:
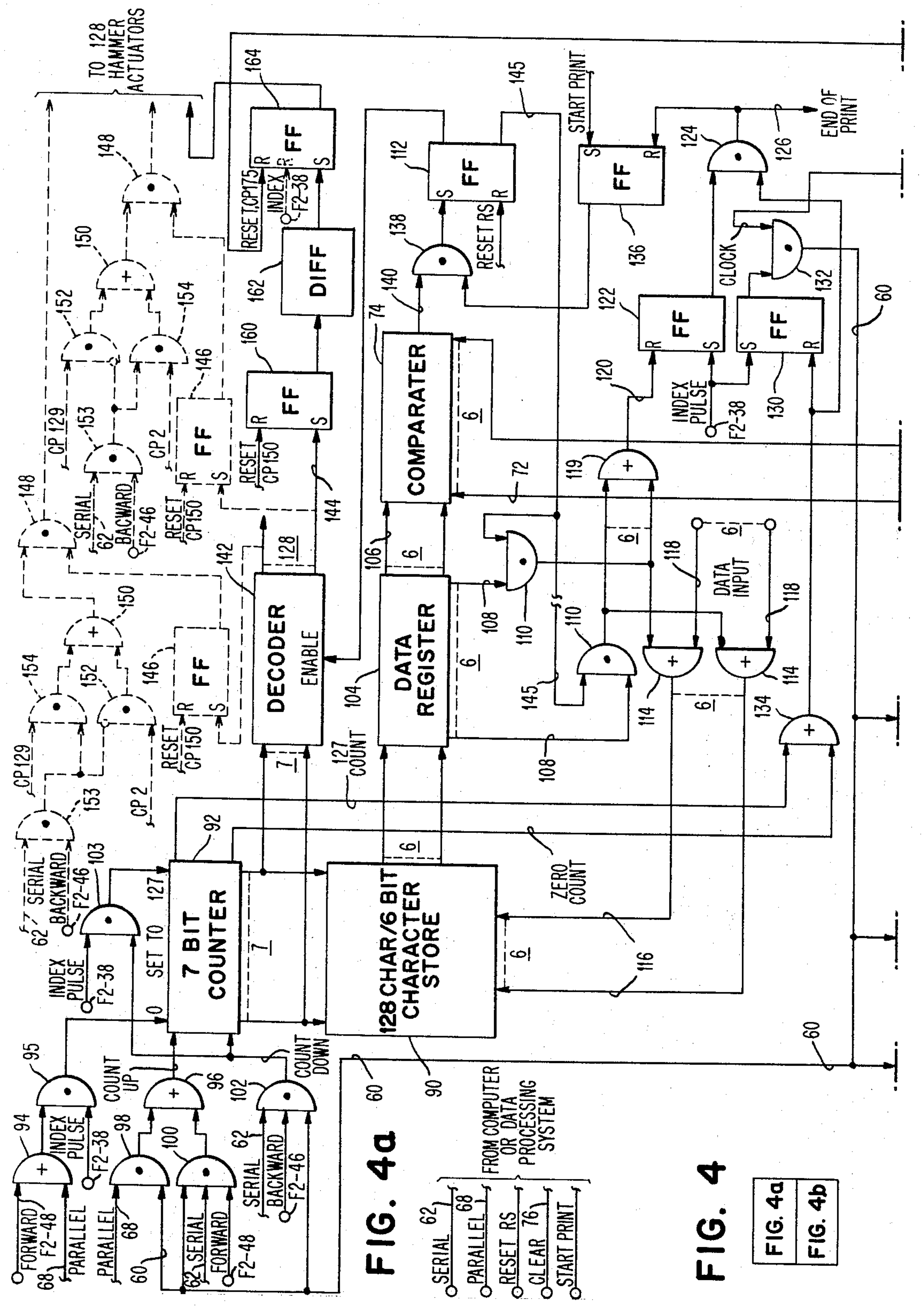

FIGURES 4*a* and 4*b*, arranged as shown in FIGURE 4, comprise a block diagram of the synchronizer which is employed with the printing bar of FIGURE 1.

Figure 5:
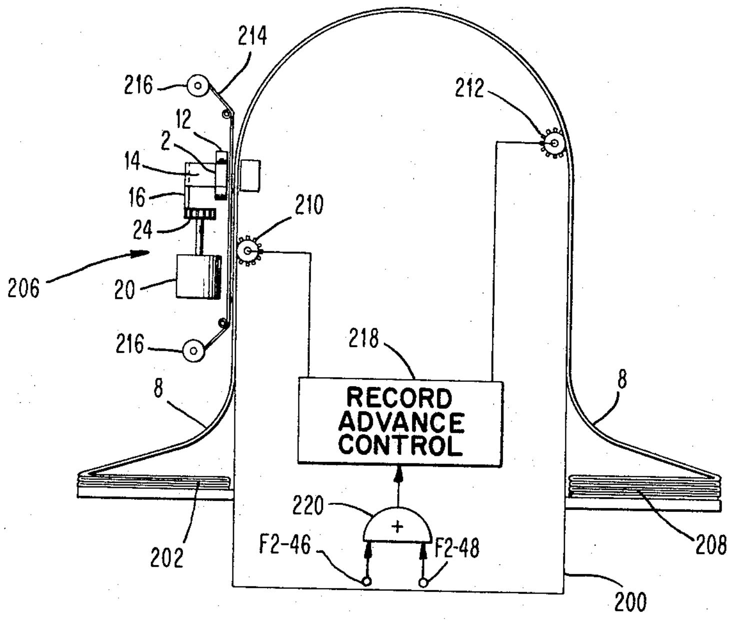

FIGURE 5 is a side view of a highly simplified printing device illustrating the manner in which the printing device of FIGURE 1 is arranged with other details of the printing system.

Figures 2B, 6:
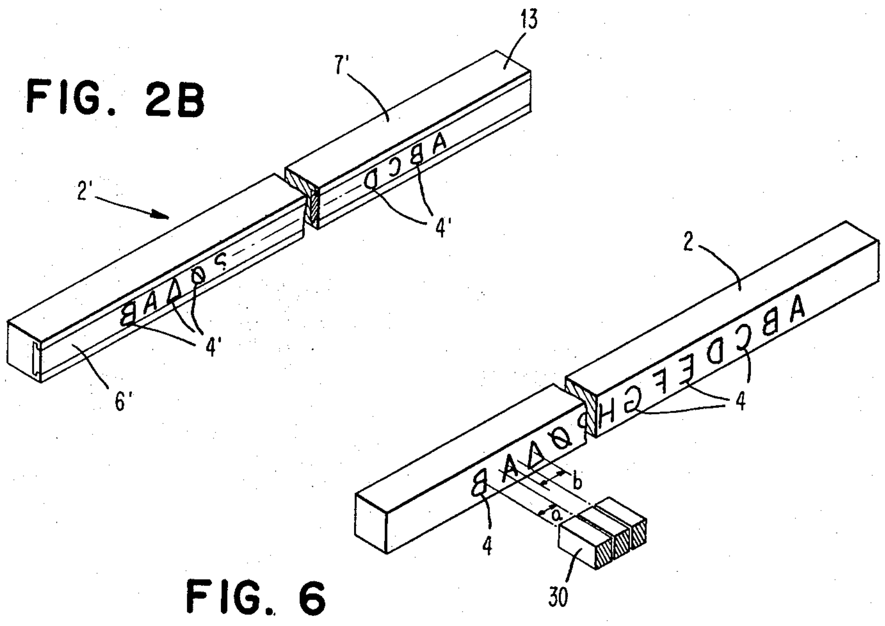
FIGURE 2B is an illustration of an alternative form of print bar which may be employed with the drive mechanism of FIGURE 1.

FIGURE 6 is a further top front view of the printing bar of FIGURE 1 and illustrates alternative embodiments of the mounting of the type font of FIGURE 1.

FIGURE 7, composed of portions *a* through *c*, illustrates the manner of operation of the print device of FIGURE 1 operating in the parallel mode with the bar moving in the forward direction.

Figure 8A:
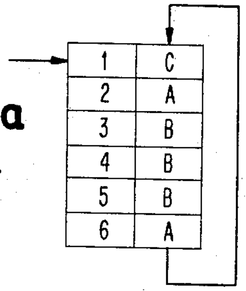
Figure 8B:
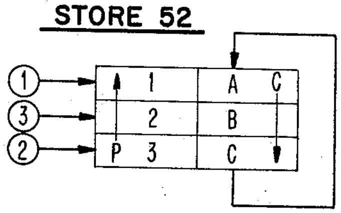
Figure 8C:
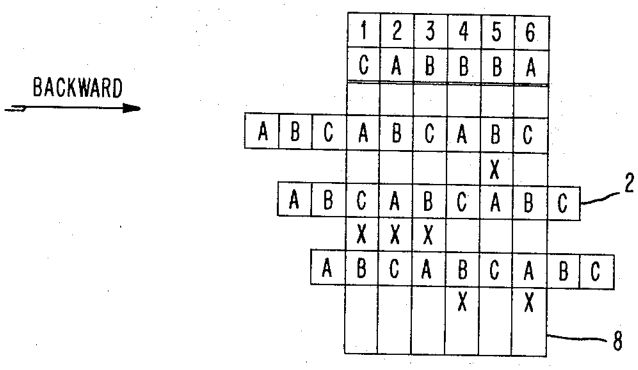

FIGURE 8, composed of FIGURES 8*a* through 8*c*, illustrates the manner of operation of the print device of FIGURE 1 operating in the parallel mode and moving in a backward direction.

Figure 9A:
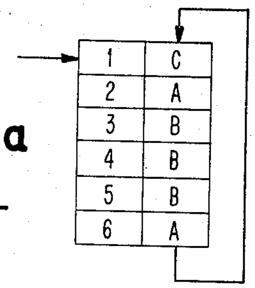
Figure 9B:
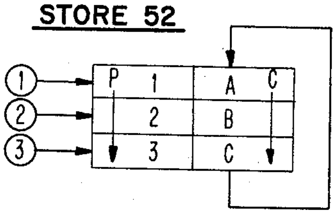
Figure 9C:
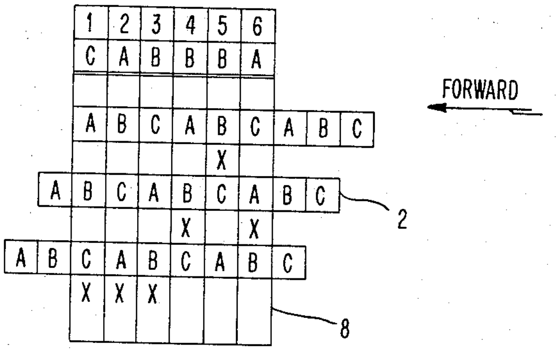

FIGURE 9, composed of FIGURES 9*a* to 9*c*, illustrates the manner of operation of the bar printing device of FIGURE 1 operating in the serial mode and moving in a forward direction.

Figure 10A:
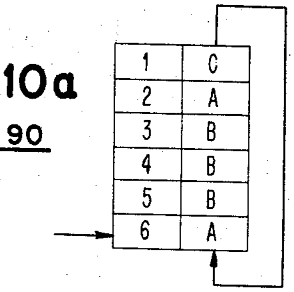
Figure 10B:
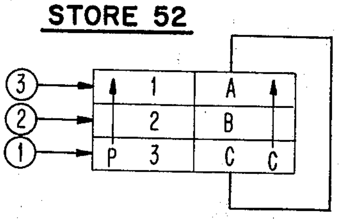
Figure 10C:
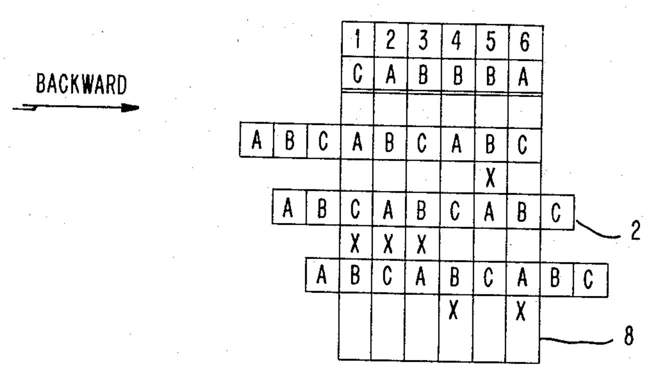

FIGURE 10, composed of FIGURES 10*a* to 10*c*, illustrates the manner of operation of the bar printer of FIGURE 1 operating in the serial mode and with the bar moving in a backward direction.

Similar elements are given similar reference characters in each of the respective figures.

Turning now to FIGURE 1, there is illustrated a printing bar, and its drive assembly as viewed from a point in front of the overall printing mechanism. The printing bar 2 is arranged with a plurality of character type 4 mounted upon a surface 6 of the bar 2. The character type 4 is arranged in a plurality of discrete fonts, that is complete repertoires of character type which may include the full alphabet, the numerals 0 to 9, and any of the punctuation and special symbols which are required or in combinations of complete fonts and portions of fonts. There may be as many repetitions of the complete font and font portions along the surface 6 of the bar 2 as is desired. Increases in the number of complete fonts and font portions along the surface permits a decrease in the length of the throw or the movement of the bar from one extreme to the other. Thus should a single font appear on the surface of the bar 2, the bar would have to travel the entire distance across the width of a record 8 presented before the bar 2. Increases in a number of complete fonts, which are placed upon the surface 6, decrease the amount of motion of the bar to a distance slightly in excess or equal to the length of a complete font itself. The printing bar 2 may be solid as is shown in FIGURE 2 or may be made in two portions as shown in FIGURE 2B, or take the form of a band as in FIGURE 2C.

The print bar 2′ of FIGURE 2B is composed of a font carrying portion 4′ and a receiving and support portion 13. The receiving and support portion 13 will be of the same general dimensions as the print bar 2 of FIGURE 2 and will have recorded upon it or otherwise placed upon its surface 7′ the required identification channels and index marks. The only difference will be the presence of a channel 6′, the length of the print bar 2′, into which font carrying portions 4′ may be inserted. When assembled the print bar 2′ will appear as a solid unit, but offers the advantage of rapid interchangeability of type fonts, e.g. different characters, etc.

FIGURE 2C offers a further form of print bar 2″ which may be used with the print mechanism of FIGURE 1. This embodiment consists of a complete thin band 4″ which is made to move independent of but within a channel provided in stationary receiving and support portion 13′. The band 4″ may have affixed to its surface 6″ character font, and said band 4″ will be made to move along the channel in the receiving and support portion 13′ a distance equal to or slightly in excess of the width of the record area to be printed upon. The band 4″ may be attached to the roller chain 24 of FIGURE 1 by means of the pin 16′ and is supported by round bearing surface 15 which in turn may be attached to the bed plate of the print mechanism (not shown). The advantage to print bar 2″ as shown in FIGURE 2C over the embodiments shown in FIGURES 2 and 2B is that the band 4″ has little mass and may be rapidly moved, while it maintains strong backup and support while in the print station due to the presence of the receiving and support portion 13′. Identification channels and index marks may be recorded on a further surface 7″ of the band 4″ and read by reading heads 34′, 42′ and 44′ placed adjacent thereto.

The print bar 2 of FIGURE 2 is moved between two pairs of guide rollers 10 and 12 to insure its horizontal alignment with respect to the record 8. The guide rollers 10 and 12 may be replaced by any other suitable type of bearing surface which will provide low friction and which will accurately control the plane and direction of movement of the bar 2. The bar 2 has affixed to its rear surface a yoke 14 mounted perpendicular to the rear surface of the bar. This yoke contains a pin 16 which is mounted perpendicular to the surface of the yoke. The drive assembly for the print bar 2 consists of a first sprocket 18 driven by a drive motor 20, which may be of the hysterisis or other type which can insure a relatively stable constant speed over its entire duty cycle. A second sprocket 22 is provided. A roller chain 24 is placed about the surfaces of the sprocket 18 and 22 and driven thereby. The yoke 14 is connected to the roller chain 24 by means of the pin 16, which may be affixed to the upper surface or to the outside surface of the roller chain 24. As a result of the constant speed at which drive motor rotates and the positive connection between sprockets 18 and 22 and roller chain 24, the pin 16 will be driven at a constant linear speed as it moves from sprocket 18 to sprocket 22 and back. As the pin 16, connected to the roller chain 24, moves from sprocket 18 to sprocket 22, the print bar 2 will be moved from the left to the right as shown in the figure by the arrow. As the pin 16 moves with the roller chain 24 from sprocket 22 to sprocket 18 the print bar 2 will move from the right to the left, anti-parallel with the arrow, due to the coupling by means of the yoke 14 and the pin 16 between the print bar 2 and the roller chain 24. During the periods of time in which the connection between the roller chain 24 and the print bar 2 at pin 16 moves about the end portions of the sprocket circumferences, there is a period in which the bar will appear to stand still. Stated another way, while the point of connection between the roller chain 24 and the pin 16 decelerates to zero velocity and begin acceleration to the maximum lineal velocity in the opposite direction, the bar will appear stationary. As will be described later, this period during which the bar remains at rest will be employed for movement of the record to present a further print line.

Turning now to FIGURE 2, additional details of the print bar 2, as well as its associated circuitry, will be described. As can be seen from FIGURE 2, on the front surface 6 of the bar 2, are arranged a plurality of character font in repeating arrangements, for example, between X1 and X2, here is a complete font starting with the character A closest to the point X2 and extending through the symbol delta closest to the point X1. One or more complete character fonts may be found in the area of the bar between X2 and X3 shown. Mounted in line with each record position where printing may take place, is a hammer 30 as is shown in FIGURE 2. The bar is assumed in FIGURE 2 to be in a position where it is starting its backward travel in the direction shown by the arrow. The convention for describing the print bar direction of travel as forward or backward will be described below.

As will be described later, the backward direction of travel is begun with the last character type on the print bar 2 positioned opposite the hammer 30 for the rightmost print column position.

Space is provided on the surface 7 of the print bar 2 for six identification channels 3 and an index channel 5. In the index channel 5 there will be a pulse generating means in line with each one of the character type in each of the fonts. Thus there will be one index pulse generated for each character type. Pulse generating means such as 32 in index channel 5 may be placed on the bar by means of magnetic recording techniques, by the embedding of small magnet sections, or any other means that may provide a signal to appropriate pickup means. The index generating means is aligned with the character type in the embodiment of FIGURE 2 due to the availability of a number of clock pulses, equal to twice the number of print spaces across the record, between successive index pulses. In the embodiment of FIGURE 2A, it is possible to reduce the number of clock pulses which are required by offsetting the index pulse generating means to produce an index pulse before the associated character identification signals are available. The index pulse can then be used for certain printing purposes as will be described below. Turning to FIGURE 2A it can be seen that the index pulse generating means 32′ in index channel 5 leads the character type identification pulse generating means in the identification channel 3.

Returning to FIGURE 2, a multichannel pickup head 34 (comprising individual heads) is positioned above the print bar 2 to read the signals recorded in the channels 3 and 5 on surface 7 of the print bar 2. A first head portion 36 of pickup head 34 is arranged to read the index pulses and provide them via line 38 to circuitry to be described below. The remaining six heads of the multichannel pickup head 34 are positioned over the six identification channels 3 on the surface 7 of the print bar 2. In this six identification channels 3 are placed further pulse generating means 32 in 64 combinations from 000 000 to 111 111 to identify the address or position along the print bar 2. Any convenient six bit code, such as the binary code for example, may be employed and the bit arrangement does not have to conform to the usual bit count of the code although following the usual count sequence simplifies the accompanying circuitry. Placed at each address or position along the print bar 2, on the surface 6 is a character type 4. The address or position recorded on surface 7 in the identification channels 3 serves to identify the position or address of the character type 4 but does not identify the character type itself. As will be described below, the address read from the print bar 2 is employed to address a type store 52 to a particular address. At this address which corresponds to the character type position will be the code for the particular character type, which may be in any number of bits according to the code chosen. The code employed herein for the identification of the character type is also a six bit code, but there is no requirement for correspondence between the address code and the character type code. Thus, if an "*e*" is located at the fifth type position, the address or position code as read from the bar will be 000 101. The type code stored at address 000 101 in type store 52 may be any value, for example 111 001. The address or position code, placed on surface 7 of the print bar 2, gives a total of 64 addresses of which only 63 are employed. These addresses provide, however, enough addresses for a repertoire comprised of a full alphabet from A to Z, the numerals 0 to 9 and such punctuation and special symbols as are needed. The reading of the coded information on surface 7 will permit the exact location of the print bar 2 with respect to a given point to be known at all times. Each of the six head portions sensing the identification channels 3 provide their outputs to separate ones of the plurality of output lines 39, each of which in turn feeds an AND gate 40. The AND gates 40, in addition to receiving the coded notation of the font, that is the bar location and character type configuration, also receive an index pulse to provide for control of the readout of the bar position signals from head 34.

From FIGURE 2 it is obvious that 2 AND gates 40 are shown and that their inputs are connected by a dashed line with the number 6 appearing adjacent the dashed line. This is a notation which is used throughout this description to indicate that 6 parallel lines are meant whereas only two are shown. Thus there is actually one line for each one of the six channels employed for the coded notation indicative of the character type. Each of these lines is connected to a separate AND gate 40, and each AND gate 40 receives a second input from the index pulse line 38. This notation is used throughout this description in order to simplify the drawings. Another notation employed is the use of a reference character adjacent an input terminal, to indicate the origin of a signal if its generation is shown in the drawings. Thus the notation F2–46 in the drawings means the signal is generated on FIGURE 2 and is provided on the line 46. The short wavy line at the end of input lines having no terminal indicates the signals are provided by external sources.

At the extremes of a single font, at the locations 9, there is found another set of pulse generating means 32 employed to produce a special signal used as an ending signal. This ending signal indicates that the print bar 2 has completed its linear motion, and that a period will follow during which no motion of the bar takes place after which the next cycle of bar motion will begin. The ending signal employed is a six bit signal and this requires a pulse generating means 32 in each of positions corresponding to the six identification channels 3. The ending signals will not be read by the head 34, because the locations 9 are never permitted to pass under the head 34 due to limitations of the maximum travel of bar 2. Instead, the ending signals are read by separate read heads 42 and 44 placed to either side of the head 34. Each of the heads 42 and 44 is a six channel head capable of providing six output signals corresponding to the six bits of the ending signal code. Each of the 6 outputs of the heads 42 and 44 are fed to a separate input of a 6 input AND gate 43 and 45 respectively. If all 6 inputs are present, then the AND gate 43 or 45 will issue an ending signal on the line 46 or 48 respectively. The ending signal read by the head 42 is fed along the line 46 and is identified as the record advance and backward signal. The ending signal read by the head 44 is fed along the line 48 and is identified as the record advance and forward signal.

The forward and backward notations are arbitrarily chosen on the following basis: a movement of the print bar 2 to the right in FIGURE 2, in opposition to the shown arrow, would provide first the letter A, then the letter B, etc. in the usual manner in which an alphabet might be provided. Therefore, the bar moving in this direction would be considered as moving in the forward direction. When the bar has moved to its extreme in a forward direction, it will next prepare to move in the opposite or rearward direction as soon as motion begins again. Therefore, the signal generated in response to the reading of the ending signal at the left extreme of the print bar 2 by the head 42 will be considered to be the backward signal since it will indicate that the bar is next to move in the direction known as backward, that is with the alphabet being presented in an inverse order. Since the bar is not moving during this time, the record may be advanced to present a second portion of the record to the printing area.

Additionally, when the bar has moved one full font in distance to the left of FIGURE 2 in the direction as shown by the arrow, the ending signal at the end of the first font near the point X2 will be read by the pickup head 44 and transmitted via the AND gate 45 and the line 48 as the record advance and forward signal. Again the record advance signal is provided at this time as the bar has completed a full travel, and is not ready to start its reverse travel. This is the period during which the yoke 14 and pin 16 connection between the roller chain 24 and the print bar 2 is moving about the outside periphery of one of the sprockets 18 or 22. As will be described below, the record advance signals on the lines 48 and 46 will be buffered together to effect the record advance control of the printer. The signal on line 48 will also be used as the forward signal to indicate that the backward motion, that is with the alphabet being presented in inverse order, is complete and the next direction of motion of the type font will be in the direction of forward sequence, that is A, B, C, etc. The manner in which the forward and backward signals are to be employed by the print synchronizer will be described below with reference to FIGURE 4.

Referring now to FIGURE 3, the various control pulses employed in the printer and their relative timing are shown. Shown at line *a* in FIGURE 3 is the index signal, described with reference to FIGURE 2, which is made available on the line 39 each time a new character type is presented under the head 36. Thus there will be a single index signal for each one of the 63 character type which appear in the complete font. Line *b* of FIGURE 3 shows the bar position signals available at the outputs of the AND gates 40 and which are derived from the six identification channels on the surface 7 of the print bar 2, read by the six heads of a multichannel head 34. Those illustrated in line *b* of FIGURE 3 may be selected as the pattern for a particular character, such as the question mark. The six pulses shown indicate that there is a pulse in each one of the six identification channels 3. It should be understood that the pattern appearing as the bar position signal may be anything from 000000 to 111111. The bar position signal on line 56 will always be available a short time after the index signal on line 38 since the bar position signal readout gates 40 of FIGURE 2 requires the index pulse for enablement.

Line *c* of FIGURE 3 illustrates the occurrence of the clock pulses at the output of AND gate 172 on line 68 which are employed to drive the counters, to be described with reference to FIGURE 4. The clock pulses may be provided by the associated computer or data processing system itself or by a separate clock source such as clock source 170. The clock rate is so chosen that there will be twice as many clock pulses between respective index pulses as there are characters to be printed on a single line of the printer. In this example, since 128 characters are to be printed on a single line, it will be assumed that there are 256 clock pulses between each index pulse. Line *d* illustrates the reset signal RS and shows that this signal is available between successive clock signals. The RS signal may be derived directly from the clock source by the use of a delay means (not shown). Thus the control signal sequence as shown by FIGURE 3 is the occurrence of an index signal, the occurrence of the bar position signals, the occurrence of a series of clock pulses, 256 in this instance, and the occurrence of 256 reset signals RS interspersed between the 256 clock signals.

Turning now to FIGURE 4, a block diagram of the synchronizer employed to control the printing device described with reference to FIGURES 1 and 2 is shown. The synchronizer employs a six plane core memory, which is word oriented. The first portion of this memory, capable of storing 128 characters is used as the storage for the characters on the line to be printed. It should be understood that this memory may be as large as is desired, dependent upon the number of characters which are to be printed on a single line. For example, should it be desired that 64 characters be printed on a single line, then the memory size could be reduced to 64 character storage. An additional portion of the memory is used as storage for the coded representations of the 63 character type of the font. Again, it should be understood that a lesser or greater number of storage locations may be employed for coded representations of the character type depending upon the number of distinct character type in the repertoire which is to be used. Should the repertoire be cut down from the 63 character type, assumed for the purpose of this description, to 48, then only 48 such storage locations would be necessary. It should also be understood that although the description is in terms of a single memory for storage of both the characters to be printed and the coded representations of the character type, this memory may be two distinct memories, one for the storage of the characters to be printed on a single line, and a second for the storage of the coded representations of the character type. The representation used in FIGURE 4 of two separate memories is for purposes of simplification of the drawing to permit the respective gates used with each memory portion to be spaced for easy understanding.

The first memory portion to be described will be the memory 52 (FIG. 4b) storing the coded representations of the character type, hereafter called the type store 52. The type store 52 is addressed by means of a six bit bi-directional counter 54 coupled to it by 6 lines. The six bit counter 54 may be pre-set to a given position by means of the bar position signals on the lines 56 from the AND gates 40 of FIGURE 2. The signal which is read by the bar position heads of the multi-channel head 34 indicate the next character which will arrive at a reference position on the record and which is to be the starting address for the type store 52 for the following print operation. The manner in which this is effected will be described in greater detail below.

The six bit counter 54 receives signals causing the counter to count in a descending manner from a preset value towards zero from a count down gate 58. Gate 58 receives count signals (which are clock signals gated by the index pulse) from the line 60, a serial signal from the line 62 (generated by the computer or data processing system), and the backward signal from the line 46 of FIGURE 2. In addition, counter 54 may be counted ascendingly, that is from a preset value to the maximum count value by means of a count up gate 63. Count up gate 63 is an OR gate which receives a first input from AND gate 64 and a second input from a further AND gate 66. The AND gate 64 receives as a first input the count signal from the count line 60 and as a second input the parallel signal from the line 68. AND gate 66 receives as a first input the series signal (provided by the computer or data processing system) from the line 62; at a second input it receives the forward signal from the line 48 of FIGURE 2, and at the third input the count signal via the line 60. The series and parallel signals as will be described below indicate the mode of firing the print hammers to determine if printing is in the serial or parallel printing mode.

The outputs of the type store 52 are read via 6 lines to the data register 70. From the data register 70 the information is read via the lines 72 to the comparator 74 to be described below. The information from the data register 70 is also read out via 6 lines to a set of 6 AND gates 75 each having an inhibiting input. The inhibiting input to each of the gates 75 is provided by means of a clear signal introduced on the line 76. The clear signal (provided by the computer or data processing system) will only be applied to line 76 when it is desired to destroy the information which is stored in the type store 52 so that the coded notations of additional character type may be placed in the store 52. It should be understood that the placing of the type on the print bar 2 and the storage of the coded representation of the character in store 52 must be consistent. That is, the first type on the print bar 2 must have its coded notation stored at address one of the type store 52. It does not matter what character type appears as character one or in what order or what characters are used as a font so long as the coded notations are stored at an equivalent type store addresses. This arrangement permits the font to be changed and only requires that the correct coded notation be placed at equivalent addresses in type store 52. The output of the AND gates 75 are read out via a set of lines 78 to the first inputs of six OR gates 80. The outputs of the OR gates 80 are read via 6 lines 82 to the input of the type store 52. New information which is to be stored in the type store 52 may be read in via a set of lines 84 to the second inputs of the OR gates 80. Input information will be read in, as described above, when it is desired to change the values stored in type store 52 and such input information will be applied after the application of a clear signal to the line 76. Thus the coded representations of the character type already stored will be destroyed in the presence of the clear signal to the inhibiting input of the AND gates 75, and will be replaced by the information applied on the lines 84. In the event that no clear signal is applied to the line 76, the information stored in the type store 52 will be recirculated via the data register 70, the AND gates 75, the lines 78, the OR gates 80, the lines 82 back to its original location within the type store 52.

The second memory portion 90 (FIG. 4a) is employed, as described above, to store the 128 characters which are to be printed on a single line of the record. This memory portion will hereinafter be described as the character store 90. Individual locations within the character store 90 are addressed by means of a seven bit bi-directional counter 92 coupled to said character store 90. Counter 92 may initially be set to a zero value by the output of an AND gate 95 which receives an index pulse via line 38 at a first input and at its second input the output of OR gate 94. The OR gate 94 receives inputs of the forward signal via line 48 and the parallel signal via line 68. From the preset value of zero the counter 92 may be made to count up to a maximum value of 127. The counter 92 is caused to count ascendingly by signals received from the OR gate 96. OR gate 96 in turn receives inputs from the outputs of AND gates 98 and 100. The AND gate 98 receives as inputs the parallel signal via the line 68 and the count signal via the line 60. AND gate 100 receives the count signal upon line 60, the serial signal from the line 62, and the forward signal from the line 48. Additionally, the seven bit counter 92 may be made to count descendingly, that is presetting the counter to a full count of 127 and decreasing this count towards zero. This countdown may be accomplished by means of the countdown AND gate 102. AND gate 102 receives at a first input the count signal via line 60, at a second input, the backward signal from the line 46, and the serial signal via the line 62. The output of the AND gate 102 is also connected to an input terminal of AND gate 103 which also receives the index pulse on line 38. AND gate 103 applies its output to a further terminal of the seven bit counter 92 to cause it to be preset to a full count of 127. Six and seven bit bi-directional counters of the type used as counters 54 and 92 are well known in the art, and will not be described in detail in that their specific characteristics form no part of the present invention. AND, OR, and AND gates with inhibiting inputs employed herein may be of any well known form, and may take the form of diode gates, transistor gates, tube gates, magnetic amplifiers, or any other suitable means.

Information stored within the character store 90 may be read via 6 lines to a data register 104 which in turn furnishes at a first group of 6 output lines 106 signals indicative of the values stored in data register 104. The lines 106 connect the data register 104 to the comparator 74. Additionally, the data from the register 104 may be read via 6 lines 108 to the 6 AND gates 110. The AND gates 110 also receive signals from the reset output terminal of a flip-flop 112 reset by every reset signal RS. The output of the AND gates 110 are read to first input terminals of the OR gates 114 and are then returned to the input portion of the character store 90 via a set of lines 116. The second input to the OR gates 114 are provided via the lines 118 from a data source to permit the information stored within the character store 90 to be altered to represent a further line to be printed. Thus, with the reset signal output of flip-flop 112 present, the information which was stored in the character store 90 will be returned thereto at the same locations. Should the signal from the reset output terminal of flip-flop 112 be absent, the information then stored at a particular location would be blanked out, and the location left blank unless further information was introduced at the data input lines 118. The outputs of the 6 AND gates 110 are also applied to an OR gate 119 whose output is applied via a line 120 to the reset input terminal of a flip-flop 122. The flip-flop 122 was originally placed in a set condition by an index pulse on the line 38 from the print bar 2. The detection of any output from the character store 90 by means of OR gate 119 will cause the flip-flop 122 to be reset removing the set signal.

The flip-flop 122 in conjunction with the AND gate 124 is used to control the generation of the end of print signal on the line 126 to indicate that a complete line had been printed and to alert or control an input device (not shown) to send further information via the data input lines 118 to the character store 90. The generation of the end of print signal on line 126 is accomplished in the following manner: In the printing of a single line, as will be described below, the content of the character store 90 is destroyed or blanked out character by character, as a comparison is found between the content of the type store 52 and the character to be printed in the character store 90. Thus if a location in character store 90 is blank or if a comparison has occurred and the data is not permitted to reenter the store 90 due to AND gates 110 being closed, no signal is generated at the output of AND gates 110 and applied to OR gate 119, the output of which can cause flip-flop 122 to be reset. The flip-flop 122 is thus permitted to remain in the set condition where it was placed by the index pulse at the beginning of the print operation. The set output of flip-flop 122 is the first signal applied to the AND gate 124. When the seven bit counter 92 has completed a full cycle of operation from zero to 127 or 127 to zero depending upon the initial setting of the counter 92, a signal will be issued to the OR gate 134, which in turn will feed the second input of the AND gate 124 to cause the generation of the end of print signal on line 126. Thus, if during the entire count period of counter 92 (from zero to 127 or 127 to zero depending upon the initial setting of counter 92) there has not been a location in the character store 90 where information remains stored, the complete line has been printed out, and the print operation is terminated. If any value is found stored in the character store 90 during this time, the flip-flop 122 will be in the reset condition, and will not allow the passage of the zero count or the 127 count signals via OR gate 134 to AND gate 124 to produce an end of print signal in the line 126. The end of print signal on the line 126 is employed to reset the flip-flop 136 which had been set by a start signal originating in the computer or data processing system (not shown) and applied at the start of a printing cycle. The set output of the flip-flop 136 is in turn applied to a first input of an AND gate 138, the function of which will be described below.

The index pulse on the line 38 is also applied to the set input terminal of a further flip-flop 130. The set output of flip-flop 130 is applied to a first input terminal of an AND gate 132 which receives at its second input terminal, clock pulses from a clock source 170. The clock pulses as described above must be such that there are 256 such clock pulses occurring between each index pulse. The clock pulses are applied to the AND gate 132 and result in the generation of the count pulse which appears upon the line 60 connected thereto. Resetting of the flip-flop 130 is controlled by means of an OR gate 134 which receives at a first input terminal the zero count signal and at a second terminal the 127 count signal, both originating at the seven bit counter 92. Thus, upon the completion of a scan of all the addresses from zero to 127 (or from 127 to zero depending upon the initial setting of the counter 92), the flip-flop 130 will be prevented from causing the stepping of either the character store 90, or the type store 52 through further cycles of operation until the occurrence of another index pulse, generated when the print bar 2 is in its next sequential position.

Comparator 74, as has been described above, receives the output of the data register 70, which is the coded representation of the character type next available for printing via the lines 72 and further receives via the lines 106 from the data register 104 the coded representation of a character to be printed. An agreement between these two coded representations indicates that the print bar 2 is in a position to print a particular character and that the same character is to be printed in that column and printing may take place. The output signal of the comparator 74, indicating agreement, is fed via the line 140 to a first input of the AND gate 138. The second input, as has been described below, comes from the set output of the flip-flop 136. The output of the AND gate 138 is applied to the set input of a flip-flop 112 to cause the flip-flop to produce a set output. That output is applied to the enable input of a decoder 142. The decoder 142 also receives the output of the counter 92. These inputs from the counter 92 are decoded by the decoder 142 to produce outputs on one of the 128 lines 144 which are in turn connected to additional circuitry to control the firing of the 128 hammers for printing.

After each clock period, during which one of the characters in the character store 90 and one character from the type store 52 are compared, flip-flop 112 is reset by means of the reset signal RS. As a result of flip-flop 112 being placed in the reset mode, it applies a signal via the line 145 to the second inputs of the AND circuits 110. Thus, as long as the flip-flop 112 is reset, indicating that no comparison has occurred since the last RS signal, the gates 110 are operated to permit the information from the character store 90 to be read via the data register lines 108, the AND gates 110, the OR gates 114, the lines 116, back to the same location from which they were read. In the event, however, that comparison is found, the flip-flop 112 will be set by the output of AND gate 138 and will cause the removal of the reset output from line 145, and the consequent removal of the second input to AND gates 110 preventing further circulation of information from the character store 90 back to itself. Any information passed via the AND gates 110, the OR gate 119, and line 120, due to a lack of comparison, will reset the flip-flop 122, and prevent the generation of an end of print signal on line 126 during that period. The setting of flip-flop 112, as described above will have a further result beyond controlling the AND gates 110. The setting of flip-flop 112 will also enable the decoder 142 to allow one of the 128 hammers to be selected at the same time as the recirculation path for the character store 90 is opened and the flip-flop 122 is maintained in the set condition.

The output of the decoder 142 once it has been enabled by a signal from the flip-flop 112 may then be fed to one of the 128 hammer actuators to cause printing on the record. The printing may take place in either of two manners, that is in the parallel or the serial mode. In the parallel mode of printing, all the characters which can be printed at a single time are printed at the same time; for example, if the print bar 2 is in such a position that five characters match up in location between the print bar 2 and the columnar location of characters to be printed, then these five characters may be printed simultaneously. The second printing mode mentioned above is the serial mode. In this mode only a single character will be printed for each timing signal and printing will take place in the direction antiparallel with the direction of movement of the print bar 2. In serial printers it is not necessary that each column be printed in sequential order but rather than only one hammer is fired at a single time. Printing may be performed in either mode by the printing device described depending upon the particular type of circuitry for controlling the hammer activators.

Assuming a parallel mode of printing, the output of the decoder 142 must be fed to a set of flip-flops to store the comparison signal long enough for the hammer to travel to the record after actuation, traveling with proper speed and impact force. Each of the 128 lines 144 is connected to a set terminal of a flip-flop 160, in the correct columnar position. Only one columnar position, the 128th, is illustrated to simplify the drawing; each will be similar to that shown for column 128. A clock pulse such as clock pulse 150 is connected to the reset terminal of the flip-flop 160 to cause the flip-flop 160 to produce a signal which is applied to the differentiating circuit 162. The clock pulses, as described briefly above, are provided by a clock source which may be in the central computer or data processor or within the printer itself. Such a clock source is shown at 170 to provide both clock signals and special timed clock signals CP*n*. The clock source 170 feeds inputs to an AND gate 172 which also receives the set output of flip-flop 174, which is set by the application of an index pulse to its set input. The clock signals from the AND gate 172 are fed to a clock output line 68 which is connected to an input of AND gate 132 as described above. The output of AND gate 172 is also fed to a counter 176 to generate the specially timed clock signals required, such as clock pulse 150, hereinafter identified as CP150. The final clock pulse CP256 is fed back to the reset terminal of flip-flop 174 to prevent the further stepping of the counter 176 by the clock source and to reset the counter 176. The differentiating circuit 162 in turn applies its output to the set terminal a second group of flip-flops 164. The flip-flop 164 may be reset by a further clock pulse such as CP175. The signal produced as a result of resetting the flip-flop 164 is employed to operate the hammer actuators (not shown). The reason for the two levels of flip-flops such as 160 and 164 can be explained in terms of the time required to reset the flip-flops and have the flip-flop 160 ready to accept the next comparison information. The flip-flop 160 is set as soon as a comparison is found. The flip-flop 160 must be reset before the print bar 2 can cause a further comparison signal to be generated. It should be understood that the print bar never stops moving and that the comparison and printing operation must take place while a desired character type is moving within the limits of a printing column. Therefore, after a finite time the flip-flop 160 is reset and its stored value is transferred to flip-flop 164. Flip-flop 164 retains its setting until it is reset by clock pulse CP175 at which time the hammer is fired and the flip-flops 164 awaits the next transfer from the flip-flop 160. The differentiating circuit 162 is employed to provide a set input to the flip-flop 164 from flip-flops 160 upon resetting of the flip-flop 160 only if the flip-flop 160 had been set. The selection of the values used for the flip-flops 160 and 164, and the differentiating device 162 as well as the time when they must be operated is chosen such that the print bar 2 is still in such a position that the proper character may be printed in the desired column. This embodiment requires, as noted above, that the index pulse generator 32' in channel 5, lead the character type address code in channels 3 by a sufficient amount that printing can take place before the print bar 2 has moved to the next columnar position to present a further character type. With the embodiment of FIG. 2A, comparison would be made during the first 128 clock pulses and the flip-flop 160 set, the flip-flop 160 would be reset at clock time CP150 to set the flip-flop 164 via differentiator 162. The index pulse would then be used to reset flip-flop 164 causing printing and setting the printer for a further cycle of operation.

The second mode of printing, that is, the serial mode, is best described with reference to the following gates:

the output from the decoder 142 is fed via the lines 144 to the inputs of flip-flops 146, of which there are 128, one for each column. The FIGURE 4*a* illustrates the hammer actuator gates and flip-flop for column 1 and column 128. Those between these limits will be similar. The outputs of the flip-flops 146 are in turn fed to first inputs of AND gates 148. The second input to the AND gate 148 is provided by the OR gate 150. The OR gates 150, in turn, receive inputs from the inhibiting AND gate 152, and the AND gate 154. The inhibited AND gate 152 for the left-most column, for example, receives at its input, clock pulse CP2 and at its inhibiting input the output of AND gate 153 which receives the serial signal on line 62 and the backward signal on line 46. The output signal of AND gate 153 is also applied to a first input of the and gate 154, which further receives the clock pulse CP 129. This is to insure that the hammer actuators may be fired in proper sequence regardless of the direction of travel of the bar.

It should be recalled that in a serial mode, it is desired to fire one print hammer actuator at a time and in a direction opposite to the direction of movement of the bar; for example, if the bar is traveling from the highest column to the lowest, that is from column 128 towards column 1, and the first letter of the bar is over the column position 120, printing would take place in the sequence 120, 121, through 128. The direction of motion of the bar and the direction of actuation would be opposite for the bar traveling in the reverse direction. When a bar is moving in a forward direction (that is where the font is being exposed in ascending order starting with the first letter A) the clock pulse CP2 will be allowed to pass through gate 152, gate 150, and cause the operation of the gate 148 in accordance with a comparison signal from the decoder 142. Operating in the backward mode, the backward signal on line 46 will block the transmission of the clock pulse signal CP2 via the AND gate 152, but will alert, along with the serial signal, the AND gate 154 to pass the clock pulse signal CP129 to operate the OR gate 150 and the AND gate 148 to permit the passage of the output of the flip-flop 146 to the hammer actuators. Thus either the clock pulse CP2 or CP129 is used to actuate the hammers in the proper sequential arrangement.

Additionally, provision must be made for properly actuating the hammer actuators in their timed sequence and in accordance with the serial printing mode. Since the comparison between the contents of the store 90 and 52 would require a full clock pulse time, the result of such comparisons must be gated to the print hammer actuators during the next clock pulse. Thus, if clock pulse CP4 causes the count signal which reads out storage locations 4 in both stores 90 and 52, the result of the comparison could only be gated to the hammer actuators at clock pulse CP5. In FIGURE 4, the AND gate 152 for the left-most column hammer actuator is operated by clock pulse CP2 rather than by clock pulse CP1.

A further variation is required for the serial mode of operation to permit sufficient time for print hammer travel once it is actuated. This is accomplished by increasing the spacing between character type upon the print bar 2 so that a hammer and the character type can meet at the proper point. The variation required is shown by the arrangement in FIGURE 6 wherein the hammers and the type on the print bar 2 are not mounted at the same pitch. That is to say that the center of the hammer is not along the center position of the type on the print bar 2. The center to center distance of the hammers 3 is *a*, as in FIGURE 2, but the center distance for adjacent character type is increased to a distance *b*. The distance *b* is greater than the distance *a*, which represents the distance between respective type centers, by a distance equal to the movement of the print bar 2 during one clock signal interval. By providing this increase type spacing, the type desired will arrive at a print position at the same time as the hammer but printing will take place one clock time or one clock pulse later than the clock pulse at which the hammer actuator was operated. This arrangement is in distinction to that shown in FIGURE 2 where the distance between the centers of the hammers 30 and also between the centers of the type, designated by the letter *a*, is the same for both. The same pitch is possible for the parallel mode because any time adjustment necessary for hammer travel time can be provided by the double level flip-flops employed as set out above.

Turning now to FIG. 5, there is shown a side view of a highly simplified printer. As can be seen from the figure, there is an overall housing and support member 200, which has a front shelf 202 for receiving a stack of fan-folded continuous record material 8. This material 8 is fed over the support member 200 through a printing station 206 to the rear portion of the support 200, where a further shelf 208 is provided for receiving and stacking the printed fan-folded record as shown. The record 8 is advanced from the input stack on the shelf 202 to the output stack on the shelf 208 by means of a series of sprocket pairs 210 and 212. Although a single sprocket is shown for each of the pairs 210 and 212, it should be realized that there is a sprocket such as 210 on each side of the record, one being invisible behind the sprocket 210 shown in the figure. The same is true of sprocket 212. A ribbon, such as 214 may be moved between a set of rollers 216 through the printing station 206. The print bar 2, shown with its mountings and drive motor 20 in highly simplified fashion is shown in the printing area 206. The record 8 advance is controlled by means of a record advance control device 218 which is activated by the record advance signal from the OR gate 220. OR gate 220 receives a first input from the line 46 of FIG. 2, which conducts the record advance and backward signal and a second input from the line 48 of FIG. 2, which conducts the record advance and forward signal. As was stated above, a complete line is printed for each direction of motion of the print bar 2 from one columnar limit to the other, thus forward and backward signals are employed to permit two record advance operations for one complete cycle of motion of the print bar 2.

Turning again to FIGS. 3 and 4, the general mode of operation of this device will be set out. It is assumed for purposes of simplicity, that type store 52 has been loaded via the OR gates 80 and input lines 84 with coded representations of the character type which appears on the print bar 2 and at addresses corresponding to the type location on the print bar 2. It is also assumed that a complete line of data to be printed out has been stored in character store 90 via OR gates 114 and data input lines 118. It is further assumed that a print operation is to take place and that the computer or data processing system associated with the printer is providing the required signals to the printer. A first one of these signals which are made available is the serial or parallel signal which determines the printing mode. In the alternative these signals and their associated circuitry may be eliminated if the printer is fitted for merely a single print mode, or if this mode is set up with the aid of manual switches (not shown) on the printer itself. The additional signals provided by the computer or data processing system are the start print, the clock and RS signal and the clear signal as needed. It will be assumed for the following description that printing will be in the parallel mode and that the parallel signal is available.

The parallel signal will be applied to OR gate 94 (FIG. 4*a*), which in turn will apply a signal to a first input of AND gate 95. Since the parallel signal is continually available during the print operation, the output of OR gate 94 will continually be applied to AND gate 95, but AND gate 95 will fail to produce an output to set the counter 92 to zero until the availability of the index pulse to the second input of the AND gate 95. The start print signal is applied to the set input terminal of the flip-flop 136 causing the set output signal of the flip-flop 136 to be applied to a first terminal of the AND gate 138 to enable this gate. At this time, this enabling signal has no effect upon the AND gate 138 since the output of the comparator on the line 140 to the second input of AND gate 138 is absent. The signal from flip-flop 136 will remain applied to AND gate 138 during the entire print operation or until the end of print signal from the AND gate 124 is made available to reset the flip-flop 136. It is assumed for the purpose of this description that the print bar 2 is moving in the forward direction. It is further assumed that the print bar 2 is started in such a position that the character type A is directly in line with the first columnar position desired to be printed. As was described with reference to FIG. 2, the markings on the surface 7 of the print bar 2 will be picked up by the multi-channel pickup head 34. The first signal available for use will be the index signal picked up by head portion 36 and applied via line 38 to the set input terminal of the flip-flop 122, which in turn produces a set output that is applied to a first input of the AND gate 124. AND gate 124 is, however, inoperative at this time due to the absence of the output of OR gate 134. The index pulse is also applied to the second input of AND gate 95 to operate AND gate 95 and cause the setting of counter 92 to zero. Counter 92 in turn addresses the character store 92 at the zero address, which is the location of the character to be printed out in column 1 of the record 8. Further, the index pulse on line 38 is also applied in the set input terminal of the flip-flop 130, which in turn produces a set output signal that is applied to a first input of the AND gate 132. The index signal as shown on FIG. 2 is also applied to terminals of the AND gates 40 to gate the signals, representative of the character type address next ready for printing (in this case address zero) being read from the identification channels 3 by the remaining six heads of the multi-channel head 34 through the AND gates 40 on to the lines 56. The relative timing of the index pulse and the bar position signals are shown in lines *a* and *b* of FIGURE 3. The outputs of the AND gates 40 are fed to the six bit bi-directional counter 54 of FIG. 4*b* to set up in the counter the address which is the equivalent of the position of the A on the bar. It should be noted that although there has been indicated for the purpose of this example that the character A is located at the first print bar position; this does no have to be so under all conditions. The identification code in the identification channels 3 serves to identify a location in the type store as well as a location on the bar and at each type store location any desired character type code may be stored as long as the proper character type is placed on the print bar 2 at the corresponding position. Thus, by preserving the same addresses, any other font of characters might be placed upon the bar and similarly the coded representations thereof may be stored in the type store.

The six bit counter 54 will cause the store 52 to be addressed at the location specified by the identification code from channels 3. In this case, it would be the first address location or address zero. The information or character type code stored thereat is read from the store 52 via 6 lines to a data register 70 from which it is presented over 6 output lines 72 to a first input of the comparator 74 and via 6 further output lines to inputs of the AND gates 75. The next signal arriving will be the first clock signal after the index and bar position signals have been used to set the various elements described above. The first clock pulse shown in FIG. 3 at line *c* is the clock pulse available at the output of AND gate 172 after the index pulse has set flip-flop 174, which in turn provides the second input to AND gate 172. The first clock signal will be applied to the second input of the AND gate 132 already alerted by flip-flop 130, to produce a signal on the line 60 which will hereinbelow be known as the count signal.

The count signal, as will be described below will cause the seven bit bi-directional counter 92 and the six bit bi-directional counter 54 to be counted up or down in accordance with the printing mode (e.g. serial or parallel) and in the direction of movement of the print bar (e.g. forward or backward). Recalling that the parallel print mode and the forward direction of movement of the print bar 2 has been assumed, counter 54 must be counted up and therefore count down AND gate 58 will be inoperative. For similar reasons, the AND gate 66 will be ineffective to cause the counter to be counted up because the serial signal required on the second input of the AND gate 66 is absent. However, the AND gate 64 will receive the count signal from the line 60 and the parallel signal via the line 68 permitting the count signal to be passed through the OR gate 63 to the six bit counter 54. Thus, for each clock pulse which is passed via the AND gate 132 (FIG. 4*a*) to the line 60 as the count signal, the bi-directional counter 54 will be caused to count up. It should also be noted the counter 54 is a closed ring type counter and thus will return to a count of zero from a full count.

Turning now to the seven bit counter 92 (FIG. 4*a*), a similar set of gates as was described with reference to the counter 54 is provided to advance counter 92. The count signal on the line 60 will be passed via the AND gate 98 or OR gate 96, in that AND gate 98 merely requires inputs of the count signal, and the parallel signal on the line 68, both of which are present. The output of the OR gate 96 will cause the counting up of the seven bit counter 92. AND gates 100 and 102 are not operative since the serial signal is absent. Each count signal appearing on the line 60 will cause counter 92 to be counted up from its value of zero to a maximum value of 127 and then returned to the full zero count.

With the counter 92 set to zero, the first address in the character store 90 will be read out via 6 lines to the data register 104. The content of the data register 104 will be available via 6 lines 106 to the second input of the comparator 74. Additionally, the content of the data register 104 will be made available via 6 lines 108 to first inputs of an AND gate 110. In the event that there is a comparsion found between the first character found in the type store 52 and the first character found in the character store 90, the comparator 74 will generate a signal upon the line 140 which will pass through the AND gate 138 which had been alerted as a result of the set output of the flip flop 136. The output signal from the AND gate 138 will be applied to the set input terminal of the flip-flop 112 to cause it to produce an output at the set output terminal and thus remove the output signal from the reset terminal of flip-flop 112. The signal from the set terminal of flip-flop 112 will be passed to the enable input of the decoder 142 permitting the selection of the first of the 128 lines 144 and the setting of the first of the flip-flops 160. The removal of the reset output signal from the reset output terminal of the flip-flop 112 will remove the enabling signal from the second input of the AND gates 110. As a result, the information which is passed from the data register 104 to the gates 110 will not be permitted to enter the recirculating loop composed of the OR gates 114 and the lines 116 and be rerecorded at the position it formerly occupied. Instead this information will be destroyed at the input of AND gates 110.

The next signal available as can be seen from the line *d* of FIG. 3 is the reset signal RS. The reset signal RS is applied to the reset input terminal of the flip-flop 112 causing the flip-flop 112 to return to its reset condition removing the enable signal from the decoder 142 and returning the enabling signal to the second input terminals of the AND gates 110. The relative timing of the reset signal RS as shown on FIG. 3 is intermediate successive clock signals; thus, after each clock signal, and before the occurrence of the following clock signal, reset signal RS will be made available. The printer is now ready to make further comparisons, without the possibility of erroneous printing or data destruction.

Upon the occurrence of the next clock signal, a further count signal will be impressed on the line 60 and applied to the counter 92 to cause it to count it to count condition 1, which is address location 2 in the character store 90, the first location being assigned to count zero. The count signal will also cause type store 52 to be addressed by the counter 54 to address location 2 which corresponds to a count of 1, the first address location being at a count of zero. It should be understood that the type store 52 was addressed by counter 54 initially at a count of zero, because it was assumed that the print bar 2 was set so that its first character type, the character A, was in the bounds of column 1. The next address to read from would then be address 1 which is one counter higher than the initial address of zero. In a more general case where the print bar 2 might be positioned so that the 4th character type was over column 1, then the initial address in type store 52 would be the 4th address corresponding to the *x*th code pattern set into counter 54. The next address location in store 52 from which a character code would be read would then be based on a count in counter 54 of $x+1$. The coded representation from type store 52 will be read via the 6 lines to the data register 70 and then via 6 lines 72 to the first input of the comparator 74. In a similar fashion, the character at the selected address location in the character store 90 will be read to data register 104 where it will be transmitted via 6 lines 106 to second inputs of the comparator 74, and via 6 further lines 108 to inputs of the AND gate 110. At this time, the AND gates 110 receive the reset signal from the flip-flop 112 to enable the gates 110. However, the character from data register 104 is not made immediately available to the inputs of the gates 110 to permit the comparison signal to be available before the data is released from data register 104 so that the enable signal from flip-flop 112 can be removed before the output from data register 104 can be recirculated and rerecorded. If it is assumed for this example, that no match is found between the coded representations of the character type and the characters stored, a signal will not be issued via the line 140 to the AND gate 138. The flip-flop 112 will remain in its reset condition, and will fail to provide enabling signals to the decoder 142. Thus the flip-flop 160 associated with the second print column will not be set. The failure to set the flip-flop 112 will cause the continued output of the reset signal on the line 146 to the gates 110 and will permit the character in the data register 104 to be passed to OR gates 114, thence via the 6 lines 116 and rerecorded at the address specified by the seven bit counter 92.

After the entire content of the character store 90 and the type store 52 have been compared and prior to the next index pulse, at a time such as clock period 150, the clock pulse CP150 will be applied to the reset terminals of all the 128 flip flops 160. Any flip-flops 160 which had been set, will produce a signal as a result of being reset, which will be impressed upon the input of the differentiating circuit 162 to produce outputs to cause the second level flip-flops 164 to be set. At clock period 175 when clock pulse 175 is available from the counter 176, clock pulse CP175 is applied as a resetting signal to the flip-flops 164. As a result of the flip-flops 164 being reset, the hammer actuators (not shown) will be fired to cause printing to take place. The flip-flops 164 will have sufficient time to reach stable conditions before the next signal clock pulse CP150 resets the flip-flops 160 causing new data to be transferred to flip-flops 164. As is stated above, in the parallel printing mode, all matches found during one comparison cycle will cause simultaneous printing of these characters. After the counter 92 has received 128 pulses and arrives at the count of 127 (it should be recalled that the initial count was at zero), the counter 92 produces a signal designated the 127 count which is applied to one input of the OR gate 134 to cause the resetting of the flip-flop 130. The resetting of flip-flop 130 removes the enabling input to the AND gate 132 preventing further clock signals from passing through AND gate 132 and being applied as count signals via the line 60. The next index pulse, provided when the next character is available for printing in the first column, will cause the flip-flop 130 to again be set, and to enable further clock pulses to be applied as count pulses.

The output of OR gate 134 as a result of the 127 count signal is also applied to a first input of the AND gate 124 to pass the output of the flip-flop 122 and place the end of print signal on line 126. However, an end of print signal cannot be generated until all of the 128 columnar positions in a line have been printed, that is to say that all the 128 characters stored in the character store 90 must be printed out. The completion of the print operation is indicated by the fact that the character store 90 no longer stores characters to be printed. This is determined as was described above by the flip-flop 122 in the following manner. The output of the AND gates 110, in the recirculating path of the character store 90, are fed to an OR gate 119 whose output is conducted over line 120 to the reset input terminal of the flip-flop 122. The flip-flop 122 is initially set to its set condition by means of the index pulse applied to the set input terminal. The set output of flip-flop 122 is ineffective at the time of the index pulse to pass a signal through AND gate 124 and cause the production of the end of print signal. This is because of the absence of either the zero count or the 127 count signals to inputs of the OR gate 134 which provides the second input to AND gate 124. As soon as any character is read through the AND gates 110 and is to be returned to the character store 90, this is indicative that printing of this character has not taken place and thus there is still a character which must be further read out. It is not until all characters have been favorably compared and destroyed that flip-flop 122 can no longer be reset and thus continues to provide an output to the first input of the AND gate 124. Upon the occurrence of the next 127 count at the input to the OR gate 134, the AND circuit 124 will generate the end of print signal on line 126 terminating the print operation.

Figure 7A:
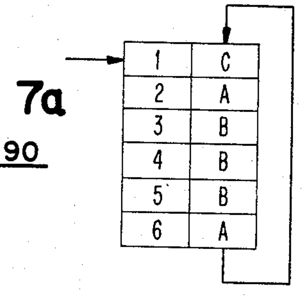
Figure 7B:
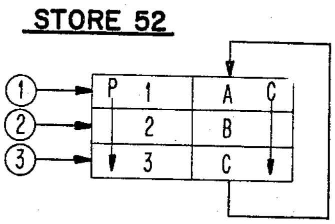
Figure 7C:
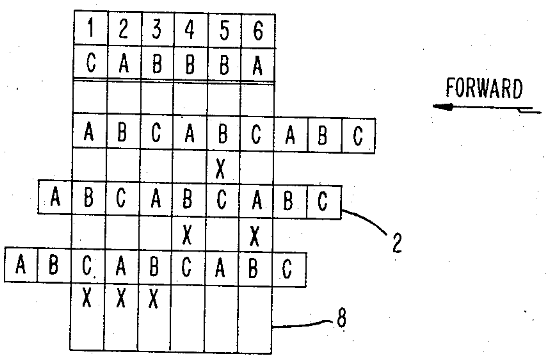

FIGURE 7 composed of FIGS. 7*a*, 7*b*, and 7*c* illustrates, in simplified form, respectively the character store 90, the type store 52 and the appearance of the record 8 with respect to the print bar 2. The character store 90, symbolically shown in FIGURE 7*a*, and appears of limited size for illustrative purposes only. It is shown to have 6 positions of storage indicated by the numbers 1 through 6 in the left hand column. These 6 positions correspond to the six columns of the record 8 of FIG. 7*c*. Listed alongside of the numbers 1 to 6 are letters which were selected at random to indicate the characters which are desired to be printed in the columns 1 through 6, which constitute a complete print line of the record 8. The arrow from position 6 to position 1 indicates the direction in which addressing of the character store 90 proceeds. The arrow to the left of the number 1 indicates this is the first position to be addressed. The type store 52 is symbolically shown in FIGURE 7*b* and is of limited size for illustrative purposes only. It is shown to have 3 positions of storage indicated by the numbers 1 through 3 in the first column, these three positions correspond to the number of distinct character type in the font employed. Alongside of these numbers are listed the 3 character type which are available on the print bar 2 and in the order available. Thus, the first character is A, the second character is B, and the third character is C. The arrow labeled P at the extreme left of the box indicates the direction of succession of initial addressing of the store 52 in respective cycles. The reason for a succession of initial addressing will be explained below. Further the arrow to the extreme right of the box labeled with the letter C indicates the direction in which the type store 52 would be counted from the entry position. Thus if the store is entered at position 1, it would be counted up towards position 2, 3, and so forth. The arrow on the outside indicates the direction of the closed loop for counting, thus from position 3, the count will return to position 1 to complete the cycle of operation. The arrows outside of the box and labeled 1, 2, and 3 indicate the entry position of the type store on the three successive initial addressings of the type store 52. Thus, for example, on the third addressing of type store 52, the C in the third font position is called out first.

In FIG. 7*c*, there is shown the record 8 viewed from the front and the print bar 2 viewed through the print bar 2 itself. The first row across the top of the record 8 contains the column number 1 through 6 corresponding to the six print columns available on a single print line. Below these column numbers are listed the characters which are to be printed and are the same as are the characters appearing in character store 90 opposite the numbers 1 through 6. The following row shows the position of the print bar 2 as it starts the print operation, with the letter A over the column 1, the letter B over column 2, the letter C over column 3, etc. In order to minimize the length of travel and to permit a complete line to be printed in the motion of the print bar 2 in a single direction, the font is repeated sufficient number of times so that a character type is over each column of the line to be printed. The font is repeated three times in FIGURE 7*c*, even though two fonts would be enough to place one character type over each column because with only two fonts, column 6 would only have the character type C presented to it. To permit all characters of the font to be presented to column 6, at least the A and B of the third font would have to be included. For the sake of simplicity the fonts are made complete in each case and the character type C is also included. It should be noted that the original position of the print bar is not important as long as a character type is over each column and each column will be exposed to every type of the font. The X in a particular column indicates that a character will be printed in this column with the particular bar position indicated.

The printing operation will take place as follows: at the first clock pulse CP1 with the print bar 2 moving in the forward direction as indicated by the arrow to the right in FIG. 7*c* and occupying an initial position with the character A over column 1, and due to the parallel print mode condition, the following gates and other elements will be effected; the OR gate 94 and AND gate 95 will cause counter 92 to be preset to zero and address the character store 90 to its first storage location 1 as shown by the arrow to the left of the box in FIG. 7*a*. The type store 52 will be preset by counter 54 to an address in accordance with the identification code read from the print bar 2. This will be the address of the first character available for printing in column 1. The initial address of store 52 is shown by the arrow to the left of the box in FIG. 7*b* and labeled with the encircled number 1. Under these conditions, the character A from type store 52 and the character C from character store 90 will be read out simultaneously. Since a match could not occur at this time no printing could take place. The second clock pulse CP2 will advance counters 92 and 54 and cause the reading out of the character B from type store 52 and an A from character store 90. Again no match will occur. In response to the third clock pulse CP3, the C will be read from the type store 52 while the B is read from the character store 90. Again no match occurs. As described above, the counter 54 used to address the type store 52 is a closed loop counter and thus after reaching a count of three will return to a count of 1 to cause the addressing of type store 52 location 1 to reread its contents at clock pulse CP4. Thus the A is read from type store 52 while the B is read from character store 90. Again no match occurs, and no printing can take place. In response to clock pulse CP5, the B from storage location 2 of type store 52 and the B from storage location 5 of character store 90 will be read out, a match will occur which will cause the setting of the flip-flop 160 for column 5 as described with reference to FIGURE 4, the printing, however, will not result at this time. Finally, the C is read from the type store 52 at location 3, and the A is read from location 6 in the character store 90 at clock pulse CP6; again no match occurs. While the character type B is still aligned with column 5, a reset for example at clock pulse CP8 will be applied to the flip-flop 160 to transfer its output through differentiating circuit 162 to set the flip-flop 164. A further reset signal, for example at clock pulse CP10 will be applied to the flip-flop 164 to cause the firing of a hammer at this time so that the character B is printed in column 5.

When print bar 2 is aligned so as to place the second font character, the character B over column 1, the next group of clock pulses are employed to address the respective stores 52 and 90. Due to the fact that the character type B is now over column 1, the type store 52 must be initially readdressed at location 2 so that the coded representation of the character type B is first read from the type store 52. Thus type store 52 is addressed at the address indicated by the arrow labeled with the encircled 2 at the left in FIGURE 7*b*. Since the print bar 2 continually moves left presenting a different character type to column 1 each time, the type store 52 must be addressed at the beginning of each clock cycle (after each index pulse) at the next higher address than that used in the previous operation. This advance of the initial address is accomplished by means of the identification codes read from channels 3 the print bar 2 itself. The character store 90 is addressed at the same starting point for each print cycle since the desired location of the characters to be printed is fixed and does not change. At clock pulse CP1, the B at address 2 in the type store 52 will be read out at the same time as the C from address location 1 in the character store 90. A comparison does not exist at this time and no printing takes place. No comparison will be found until clock pulse CP4 is applied to the counters 54 and 92 at which time type store 52 is addressed at location 2 which is letter B and character store 90 is addressed at location 4, which is also the letter B. At this point, the flip-flop 160 of FIG. 4 will be set, but no printing operation will take place. No comparison will result at clock pulse CP5 due to the C from store 52 and the B from store 90. At clock pulse CP6, the A read from location 1 of store 52, and the A from location 6 of store 90 will result in a further match which will cause the flip-flop 160 in the 6th column to be set. The flip-flops 160 will operate as described above to set the flip-flops 164 at clock pulse CP8. The flip-flop 164 will cause simultaneous printing of the B in column 4 and the A in column 6, as a result of the resetting of the flip-flops 164 at clock pulse CP10. The continued advance of the print bar 2 will place the letter C over column 1 in the position shown by the last bar position of FIG. 7*c*. As a result, the type store 52 will now be addressed so that the initial address from which information will be taken from the type store is location 3. The addressing pattern of store 52 will be locations 3, 1, 2, 3, etc. The store 90, however, will be read in its usual manner starting at location 1 and continuing through address 6 before returning to address 1 for further counts. As shown in FIG. 7*c*, a comparison is found between address location 3 and 1, 1 and 2, and 2 and 3 of the stores 52 and 90 respectively. As a result of flip-flops 164 being set, the characters C, A, and B will be printed in the columns 1, 2 and 3 respectively. All three hammers are fired simultaneously due to the use of the parallel printing mode.

FIG. 8 composed of FIGS. 8*a*, 8*b*, and 8*c* also deals with the parallel printing mode, but with the print bar moving in the backward direction, that is the font being presented in inverse order—C, B, and A. FIG. 8*a*, which represents the character store 90, is in all manner equivalent to FIG. 7*a*. FIG. 8*b*, which depicts the type store 52 is similar to FIGURE 7*b* except that the direction of initial addressing is opposite, that is from location 3 to location 1, then to address 3 again, etc. This new direction of initial addressing is necessary because the direction of the print bar is reversed with respect to FIGURE 7. Further, the other in which the locations of type store 52 are addressed is different than that shown with respect to FIG. 7*b*. The reason is obvious when the direction of motion of the print bar 2 as shown in FIG. 8*c* is considered. It is seen that when the print operation is begun, the character A, which is the first character of the second font on the print bar 2 is over column 1 of the record 8. Under these conditions character A will be the first character available to column 1. The store 52 is addressed in accordance with the code read at column 1, which make available the character code for the A. Location 1 is first addressed in store 52. When the bar has moved to place the C over column 1 (the C is the last character of the first font) location 3 of store 52 must be addressed. The continued movement of the print bar next places the B over column 1, the letter B is the second character of the first font. Location 2 is the third initial address. These initial addresses are indicated by the circled numbers with arrows pointed to the respective locations of the store 52. The order is address 1, address 3, address 2, and cyclically in that order, therefore initial addressing goes upwardly toward address 1 and completing the loop back to address 3. This is equivalent to the direction of motion of the print bar 2 and agrees with the manner in which the fonts are respectively presented to the column 1 of FIG. 8*c*.

FIG. 9 composed of FIGS. 9*a*, 9*b* and 9*c* relate to and depict the serial print mode. In FIG. 9*a*, the operation of character store 90 is symbolically shown; in FIG. 9*b*, the operation of the type store 52 is symbolically shown, and in FIG. 9*c*, the appearance of the print bar 2 and the record 8 are symbolically shown. As is obvious from a consideration of the FIGS. 9*a*, 9*b*, and 9*c*, which depicts the serial print mode with the print bar 2 travelling in the forward direction (that is with the font being presented to column 1 the normal sequence of characters A, B, and C, etc.) and FIGS. 7*a*, 7*b*, and 7*c*, which depict the parallel printing mode with the bar also moving in the forward direction, there is no difference in the manner in which store 90 is addressed, or in which store 52 is initially addressed or counted.

The only distinction that should be noted is the manner in which the actual printing takes place. For example, when considering the print bar 2 in the second position, that is with the letter B over the first column 1, the resulting comparison between stores 52 and 90 which would occur at clock pulses CP4 and CP6 will not result in the firing of the print hammers simultaneously, but rather sequentially. The comparison occurring as a result of clock pulse CP4 occurs first in the time and causes the decoder 142 of FIGURE 4 to select one of the lines 144 which in turn sets in a corresponding columnar position a flip-flop 146 whose set output is connected to a first input of an AND gate 148. The clock pulse CP5, that is one clock pulse later than the clock pulse during which the comparison was found (CP4) passes through AND gate 152 (the backward signal would be absent at this time and cannot inhibit AND gate 152). The output of AND gate 152 is passed via the OR gate 150 to the second input of the AND gate 148 to produce a hammer actuating signal. Thus at the time of clock pulse CP6 when the print bar is opposite, the hammer for column 4, printing takes place. It should be recalled that the hammers are displaced one clock period in order to allow sufficient time for the hammer to travel from rest to the striking position at the record. Thus the column 4 will be printed at clock pulse 6 rather than CP4 due to the one clock pulse delay in firing the actuator and one additional clock pulse delay due to the type pitch. The characters in column 6 will be compared at the time of CP6 but will not cause printing until CP8 at which time the print bar 2 will be positioned with respect to the proper hammer, and the character will be printed. In this manner, the three characters found to compare in the columns 1, 2, 3 as a result of the bar moving to its third position will be printed two clock periods later; column 1 will be printed at CP3, column 2 at CP4, and finally column 3 at CP5.

Turning now to FIG. 10 composed of FIG. 10*a* illustrating symbolically the arrangement and addressing of character store 90, FIG. 10*b* illustrating symbolically the arrangement and addressing of type store 52, and FIG. 10*c* showing the arrangement of the record 8 and the print bar 2, the manner of operation of the device operating in the serial printing mode and with the print bar moving in a backward direction may be set forth. As shown in the FIG. 10*c*, the print bar 2 is positioned so that the character type C, of the third font, is over column 6 in a similar manner to that shown in FIG. 8*c* depicting the parallel printing mode with the print bar 2 moving in the backward direction. However, since the hammers must be fired in sequential order along with the direction of movement of the print bar 2, addressing of both the type store 52 and the character store 90 will be opposite to that employed for the parallel printing mode. This is required because the hammer for column 6 must be fired first, then the hammer for column 5 etc. to properly match the print bar 2 positions to the hammer arrangement. It should be recalled that the character type is spaced so that sufficient time is provided for hammer travel time before the character type arrives at the printers point. To cause the hammers to be fired in reverse order in column 2, etc. would fail to provide the time required for hammer travel. Character store 90, as shown in FIG. 10*a*, is addressed beginning at address 6, and is then stepped along to address 5, 4, through 1 and then completes the cycle to location 6. To permit the initial addressing of the store 90, the seven bit counter 92 is preset by a signal to the 127 input terminal of counter 92. The 127 input of counter 92 is operated by the output of the count down AND gate 102. AND gate 102, receives the serial signal, the backward signal and the count signal as shown in FIGURE 4. Since the character type C is the first character available at column 6, the location for the third character type position in store 52 is addressed first. This will call out the chracter code of the letter C. Counting and initial addressing will take place as shown by the arrows labeled C and P respectively. The printing will take place in the same serial manner as is described above two time periods later than the comparison occurs.

While a particular form of synchronizer or print control has been described for the purpose of presenting the best mode contemplated for carrying out the invention, it should be understood that the bar printing mechanism described herein may be used with other forms of synchronizers and print controls, and it is not intended to limit the scope of the invention in any manner by the disclosed and described print synchronizer, which also has utility in other separate and distinct arrangements.

While there have been shown and described and pointed out the fundamental novel features of the invention as applied to preferred embodiments, it will be understood that various ommissions and substitutions and changes of the form and details of the device as illustrated and in its operation may be made by those skilled in the art, without departing from the spirit of the invention.

The embodiments of the invention in which an exclusive property or privilege is claimed are defined as follows:

1. In an apparatus for printing a plurality of characters in a pluarlity of character spaces across the width of a record means, a print means comprising: type bearing means mounted for movement across said character spaces, said type bearing means having a plurality of character types disposed on a surface thereof; drive means coupled to said type bearing means for continually and automatically moving at least one of said character types on said type bearing means alternately in a first and second direction across a plurality of said character spaces; a plurality of selectively operable print hammer means, each print hammer means being disposed adjacent one of said character spaces; and selection means coupled to said print hammer means to selectively operate a print hammer means when a desired character type is aligned with a desired character space whereby said record means is forced against said desired character type at the desired character space.

2. An apparatus as defined in claim 1, wherein said type bearing means is a rigid type bar member, said type bar member and said character type being integral.

3. An apparatus as defined in claim 1, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

4. The apparatus defined in claim 1 wherein said drive means moves said type bearing means substantially the same distance in each direction.

5. In a printing apparatus, record means adapted to receive a plurality of characters in a plurality of aligned character spaces across its width; a print means comprising; a type bearing means mounted for movement across said character spaces; said type bearing means having a plurality of character types comprising at least one font disposed on a surface thereof; automatically and continually operating drive means coupled to said type bearing means for alternately moving substantially all the character types of a font on said type bearing means past one of said character spaces, first in one direction and then in a second direction; a plurality of selectively operable actuator means, each print hammer means being disposed adjacent one of said character spaces; said record means being placed between said type bearing means and said selectively operable print hammer means; ribbon means; ribbon drive means coupled to said ribbon means for moving said ribbon between said record means and said type bearing means in a direction perpendicular to the directions of movement of said type bearing means; and selection means coupled to said print hammer means to selectively operate said print hammer means when a desired character type is aligned with a desired character space whereby said record means is forced against said ribbon means and in turn against said desired character type causing said desired character to be imprinted upon said record means, at the desired character space.

6. An apparatus as defined in claim 5, wherein said type bearing means is a rigid type bar member, said type bar member and said character type being integral.

7. An apparatus as defined in claim 5, wherein said type bearing means comprises: a support carrier having a longitudinal channel in a surface thereof and adapted to receive and support character type in said channel; a type blank adapted to be inserted in said longitudinal channel of said support carrier, said character type being mounted upon said type blank whereby when said type blank is inserted in said channel of said support carrier, said type blank and said support carrier move together as a unitary member.

8. An apparatus as defined in claim 5, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

9. In an apparatus for printing a plurality of characters in a plurality of aligned character spaces across the width of a record, a print means comprising: a type bearing means mounted for movement across said character spaces; said type bearing means having a plurality of character types comprising at least one font disposed on a surface thereof; said type bearing means further having coded notations disposed on a surface thereof at locations corresponding to each of said character type, said coded notations identifying the location of its corresponding character type with respect to a predetermined position; automatically and continually operating drive means coupled to said type bearing means for alternately moving substantially all the character types of a font on said type bearing means past one of said character spaces, first in one direction and then in a second direction; a plurality of selectively operable print hammer means each print hammer means being disposed adjacent one of said character spaces; first control means to sense said coded notations as said type bearing means is moved and produce first signals indicative of the character type location adjacent a character space on said record; storage means for storing a plurality of characters to be printed in a line; second control means to read out said storage means and sequentially produce second signals indicative of said stored characters; third control means responsive to said first signals to produce third signals indicative of the character type found at said character type location adjacent a character space on said record; comparison means for comparing said third and second signals and producing a fourth signal when said third and second signals bear a predetermined relationship to one another; and selection means coupled to said print hammer means and said comparing means and responsive to said fourth signal to selectively operate said print hammer means.

10. An apparatus as defined in claim 9, wherein said type bearing means is a rigid type bar member, said type bar member and said character type being integral.

11. An apparatus as defined in claim 9, wherein said type bearing means is a flexible type band upon which said character type is mounted; said apparatus further comprising a fixed support member aligned with said character spaces and extending the length of said character spaces and extending the length of said character spaces, said support member having a longitudinal channel extending along its length for receiving and supporting said type band along said character spaces whereby said type band is alternately moved through said channel of said support member in first and second directions.

12. In combination, a record means; a support for holding said record means in a position to present a plurality of aligned character spaces across the width of a record means at an impression receiving position; record drive means coupled to said record means for moving said record means; a type bearing means mounted for movement across said character spaces; drive means coupled to said type bearing means for continually and automatically moving at least one of said character types on said type bearing means alternately in a first and second direction across a plurality of said character spaces; and means coupled to said type bearing means and said record drive means to detect when said type bearing means has completed its travel in either direction and cause said record drive means to advance said record and make available at said impression receiving position a further portion of said record means.

13. An apparatus as defined in claim 12, wherein said type bearing means is a rigid type bar member, said type bar member and said character type being integral.

14. An apparatus as defined in claim 12, wherein said type bearing means comprises: a support carrier having a longitudinal channel in a surface thereof and adapted to receive and support character type in said channel; a type blank adapted to be inserted in said longitudinal channel of said support carrier, said character type being mounted upon said type blank whereby when said type blank is inserted in said channel of said support carrier, said type blank and said support carrier move together as a unitary member.

15. An apparatus as defined in claim 12, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

16. In a printing apparatus for printing a plurality of characters in a plurality of aligned character spaces across the width of a record, a print means comprising: a type bearing means mounted for movement across said character spaces; drive means coupled to said type bearing means for continually and automatically moving at least one of said character types on said type bearing means alternately in first and second opposite directions across a plurality of said character spaces; said drive means comprising: a first sprocket; means coupled to said first sprocket to rotate said sprocket at a constant rotational speed; a second sprocket; a continuous drive band coupled to said first and second sprockets and driven thereby at a constant speed; and connecting means coupling said drive band to said type bearing means whereby said type bearing means is moved at a constant linear speed across said character spaces as said connecting means is moved between said sprockets in a first direction and remains at rest as said connecting means moves around said sprockets, prior to the further movement of said connecting means between said sprockets in said opposite direction.

17. An apparatus as defined in claim 16, wherein said type bearing means is a rigid type bar member, said type bar member and said character type being integral.

18. An apparatus as defined in claim 16, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

19. In a printing apparatus for printing a plurality of characters in a plurality of aligned character spaces across the width of a record, a print means comprising: a type bearing means mounted for movement across said character spaces; said type bearing means having a plurality of character types disposed on a surface thereof; said character types being arranged in complete font groups, more than one of said font groups being arranged along the type bearing means length; automatically and continually operating drive means coupled to said type bearing means for alternately moving substantially all the character types of a font on said type bearing means past one of said character spaces, first in one direction and then in a second opposite direction; said drive means comprising: a first sprocket; means coupled to said first sprocket to rotate said sprocket at a constant rotational speed; a second sprocket; a roller chain coupled about said first and second sprockets and driven thereby at a constant speed; said sprockets being separated by a distance equal to one font group on said type bearing means; and connecting means coupling said roller chain to said type bearing means whereby said type bearing means is moved at a constant linear speed across said character spaces, a distance equal to one font group, as said connecting means is moved between said sprockets in a first direction and said type bearing means remains at rest as said connecting means moves around said sprockets, prior to the further movement of said connecting means between said sprockets in said opposite direction.

20. An apparatus as defined in claim 19, wherein said type bearing means is a rigid type bar member, said type bar member and said character type being integral.

21. An apparatus as defined in claim 19, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

22. In a printing apparatus for printing a plurality of characters in a plurality of aligned character spaces across the width of a record, a print means comprising: a record means; record drive means coupled to said record means for moving said record means; a type bearing means mounted for movement across said character spaces; said type bearing means having a plurality of character types disposed on a surface thereof; said character types being arranged in complete font groups, more than one of said font groups being arranged along the type bearing means length; automatically and continually operating drive means coupled to said type bearing means for alternately moving substantially all the character types of a font on said type bearing means past one of said character spaces, first in one direction and then in a second direction; said drive means comprising: a first sprocket; means coupled to said first sprocket to rotate said sprocket at a constant rotational speed; a second sprocket; a roller chain coupled about said first and second sprockets and driven thereby at a constant speed; said sprockets being separated by a distance equal to one font group on said type bearing means; connecting means coupling said roller chain to said type bearing means whereby said type bearing means is moved at a constant linear speed across said character spaces, a distance equal to one font group as said connecting means is moved between said sprockets in a first direction and said type bearing means remains at rest as said connecting means moves around said sprockets prior to the further movement of said connecting means between said sprockets in said opposite direction; and means coupled to said record drive means responsive to the completion of movement of the type bearing means in either of said first and second opposite directions to operate said record drive means to advance said record means and make available a further portion of said record means.

23. An apparatus as defined in claim 22, wherein said type bearing means is a rigid type bar member, said type bar member and said character type being integral.

24. An apparatus as defined in claim 22, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

25. In a printing apparatus, record means adapted to receive a plurality of characters in a plurality of aligned character spaces across its width: a print means comprising: a type bearing means mounted for movement across said character spaces; said type bearing means having a plurality of character types disposed on a first surface thereof; said character types being arranged in complete font groups, more than one of said font groups being arranged along the type bearing means length; said type bearing means further having coded notations disposed on a second surface thereof at locations corresponding to each of said character type, said coded notations identifying the location of its corresponding character type with respect to a predetermined position; a plurality of selectively operable actuator means, corresponding in number to said character spaces, each actuator means being disposed adjacent one of said character spaces; first control means to sense said coded notations as said type bearing means is moved and produce first signals indicative of the character type location adjacent said first control means; storage means for storing a number of characters to be printed out on a line; second control means to read out said storage means and sequentially produce second signals indicative of said stored character; third control means responsive to said first signals to produce third signals indicative of the character type found at said character type location adjacent said first control means; comparison means for comparing said third and second signals and producing a fourth signal when said third and second signals bear a predetermined relationship to one another; automatically and continually operating drive means coupled to said type bearing means for alternately moving substantially all the character types of a font on said type bearing means past one of said character spaces, first in one direction and then in a second direction; said drive means comprising: a first sprocket; means coupled to said first sprocket to rotate said sprocket at a constant rotational speed; a second sprocket; a roller chain coupled about said first and second sprockets and driven thereby at a constant speed; said sprockets being separated by a distance equal to one font group on said type bearing means; connecting means coupling said roller chain to said type bearing means whereby said type bearing means is moved at a constant linear speed across said character spaces, a distance equal to one font group as said connecting means is moved between said sprockets in a first direction and said type bearing means remains at rest as said connecting means moves around said sprockets prior to the further movement of said connecting means between said sprockets in said opposite direction; record drive means coupled to said record means for moving said record means between said type bearing means and said selectively operable means in a direction perpendicular to the directions of movement of said type bearing means; ribbon means; ribbon drive means coupled to said ribbon means for moving said ribbon between said record means and said type bearing means in a direction perpendicular to the directions of movement of said type bearing means; selection means coupled to said actuator means and said comparing means and responsive to said fourth signal during the time said connecting means is being moved between said sprockets to selectively operate said actuator means whereby said actuator means forces said record means against said ribbon means and in turn against said character type corresponding to said stored character producing an impression upon said record means at the desired character space; and means coupled to said record drive means responsive to the completion of movement of the type bearing means in either of said first and second directions to operate said record drive means to advance said record means and make available a further portion of said record means.

26. An apparatus as defined in claim 25, wherein said type bearing means is a rigid type bar member, said type bar member and said character type being integral.

27. An apparatus as defined in claim 25, wherein said type bearing means comprises: a support carrier having a longitudinal channel in a surface thereof and adapted to receive and support character type in said channel; a type blank adapted to be inserted in said longitudinal channel of said support carrier, said character type being mounted upon said type blank whereby when said type blank is inserted in said channel of said support carrier, said type blank and said support carrier move together as a unitary member.

28. An apparatus as defined in claim 25, wherein said type bearing means is a flexible type band upon which said character type is mounted; said apparatus further comprising a fixed support member aligned with said character spaces and extending the length of said character spaces, said support member having a longitudinal channel extending along its length for receiving and supporting said type band along said character spaces whereby said type band is alternately moved through said channel of said support member in first and second directions.

29. In an apparatus for printing a plurality of characters in a plurality of character spaces across the width of a record means, a print means comprising: type bearing means mounted for movement across said character spaces, said type bearing means have a plurality of character types comprising at least one font disposed on a surface thereof; drive means coupled to said type bearing means for alternately moving substantially all the character types of a font on said type bearing means past one of said character spaces, first in one direction and then in a second direction; a plurality of selectively operable print hammer means, each print hammer means being disposed adjacent one of said character spaces; and selection means coupled to said print hammer means to selectively operate a print hammer means when a desired character type is aligned with a desired character space whereby said record means is forced against said desired character type at the desired character space.

References Cited

UNITED STATES PATENTS

| | | | |
|---|---|---|---|
| 849,185 | 4/1907 | Baldwin | 74—37 X |
| 860,296 | 7/1907 | Hopkins | 197—49 X |
| 1,827,959 | 10/1931 | Stahelin | 74—37 |
| 2,663,341 | 12/1953 | Grove | 74—37 X |
| 2,918,865 | 12/1959 | Wooding | 101—93 |
| 2,933,929 | 4/1960 | Rosendahl | 74—37 |
| 2,990,767 | 7/1961 | Demer et al. | 101—93 |
| 3,007,399 | 11/1961 | Sasaki et al. | 101—93 |
| 3,057,293 | 10/1962 | Zurowski | 101—336 |
| 3,133,497 | 5/1964 | Martin | 197—57 X |
| 3,176,819 | 4/1965 | Bloom et al. | 197—133 |
| 3,216,348 | 11/1965 | Oldenburg et al. | 101—93 |

ROBERT E. PULFREY, *Primary Examiner.*

P. R. WOODS, *Assistant Examiner.*